Patented Oct. 2, 1951

2,570,087

UNITED STATES PATENT OFFICE 2,570,087

2-AMINO-4-METHYL PYRIMIDINES AND PROCESS OF PREPARING SAME

Hans Andersag, Wuppertal-Elberfeld, and Hans Mauss, Wuppertal-Barmen, Germany, assignors to Schenley Industries, Inc., New York, N. Y., a corporation of Delaware No Drawing. Application May 17, 1949, Serial No. 93,849. In Switzerland May 22, 1948

11 Claims. (Cl. 260—256.4)

The present invention relates to a chemical process and more particularly to a process for the production of aminopyrimidines.

It is an object of the invention to provide a process for the preparation of aminopyrimidines substituted by a methyl radical in the 4-position.

A further object resides in the provision of a process for the production of compounds of the following general formula

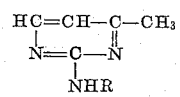

in which R is a radical selected from the group consisting of hydrogen, alkyl, aralkyl and aryl.

A further object is to provide a process by which guanidine or a N-substituted derivative thereof is condensed with 4-alkoxy-butene-3-ine-1 in the presence of an acid condensing agent.

Further objects will become apparent as the following description proceeds.

Suitable reactants for our process are for instance guanidine, acetyl-guanidine, benzoyl-guanidine, methylguanidine, ethylguanidine, n-butylguanidine, phenylguanidine, benzylguanidine and their salts.

Any 4-alkoxybutene-3-ine-1 may be used in the process according to the invention such as methoxy-, ethoxy-, propyloxy- or butyloxy-butene-3-ine-1, which may be obtained by known methods of synthesis or as byproducts of acetylene manufacture. Compounds of this type are described in French Patent 765,741 and in German Patent 601,822.

During the reaction between the guanidine or N-substituted guanidine and the alkoxybutenine, the alcohol corresponding to the alkoxy-groups is split off. The reaction is preferably carried through at room temperature or slightly elevated temperatures, not substantially exceeding 30° C.

One of the substances that can be synthesized in this manner is 2-amino-4-methyl-pyrimidine, which is used as an intermediate for the manufacture of chemotherapeutical products, has hitherto been prepared by a process carried out in several steps, viz. by converting 6-hydroxy-4-methyl-2-amino-pyrimidine by chlorination into 6-chloro-4-methyl-2-amino-pyrimidine and reducing this product by means of zinc dust to 2-amino-4-methyl-pyrimidine. For carrying out this reaction it is necessary to introduce a halogen atom as a nuclear substituent by the action of phosphorus halides and to remove it again later. Another method comprises starting with acetone which is converted by ester condensation into the sodium salt of hydroxy-methylene-acetone which is then condensed with guanidine salts into 2-amino-4-methyl-pyrimidine. In this type of synthesis, large amounts of inflammable solvents and of sodium metal must be used.

The following examples illustrate the new invention without, however, restricting it thereto:

Example 1

24 parts of 4-ethoxy-butene-3-ine-1 are added with stirring to a solution of 22.5 parts of guanidine carbonate in 100 parts of 80 per cent sulfuric acid at 20 to 30° C. Care must be taken that the temperature does not exceed 30° C. After stirring for two hours the reaction mixture is poured into 250 parts of ice water and then made alkaline with soda lye. After the addition of animal charcoal the alkaline solution is brought to the boil, filtered while hot, cooled down and exhaustively shaken out with chloroform. After evaporation of the solvent the base remains behind as a yellowish-white crystal agglomerate of the melting point 156–157° C. in an amount of about 13 parts (corresponding to 47.7% of theory). The base is preferably recrystallized from water and is obtained from chlorobenzene in form of colorless crystal needles having a melting point of 157–158° C. These colorless crystal needles, according to analysis and to the mixed melting point with a test compound proved to be 2-amino-4-methylpyrimidine. The base forms a yellow picrate which decomposes at 230–232° C.

Example 2

As described in Example 1, 22.5 parts of guanidine carbonate in 100 parts of 80 per cent sulfuric acid are condensed with 20.5 parts of 4-methoxy-butene-3-ine-1 at 20–30° C. while stirring. After stirring for 2 hours the reaction mixture is poured into 250 parts of ice water and made alkaline with soda lye. After cooling the 2-amino-4-methyl-pyrimidine separates. It is purified by recrystallizing from water with addition of animal charcoal. A yellowish-white crystal agglomerate is obtained having a melting point of 157–158° C. The yield is 13.2 parts amounting to 49 per cent of the theoretical. By extraction of the rest of the aqueous reaction mixture with chloroform the yield is increased to 58 per cent of theory.

Example 3

20.5 parts of n-butyl-guanidine sulfate are dissolved in 100 parts of 75 per cent sulfuric acid. To this solution are added by drops 10.25 parts of 4-methoxy-butene-3-ine-1 at about 25° C. and further stirred for one hour at the same temperature. The reaction mixture is poured into ice water and made alkaline with soda lye. It is then exhaustively shaken out with methylene chloride. After evaporation of the solvent a yellowish oil is left consisting of 2-n-butylamino-4-methylpyrimidine boiling under 6 mms. pressure at 109–110° C. Yield: about 12 parts corresponding to 58 per cent of the theoretical. The base forms a picrate which after recrystallizing from alcohol crystallizes in yellow needles which melt at 133–134° C.

N-butyl guanidine sulfate used for condensation crystallizes from 95 per cent alcohol in white needles which melt at 212–213° C.

*Example 4*

To 40.5 parts of phenyl guanidine in 120 parts of 80 per cent sulfuric acid there are slowly added 24.6 parts of 4-methoxy-butene-3-ine-1 at 20-30° C. The mixture is stirred for two hours at the same temperature. After pouring into ice water the reaction mixture is cautiously made alkaline with soda lye. A dark-colored viscous mass precipitates which is preferably separated by decanting. By adding more soda lye the crude base is precipitated in solid form and can be sucked off. Yield: about 25 parts corresponding to 45 per cent of the theoretical. By recrystallization from methylalcohol while adding animal charcoal the reaction product is purified and 2-phenyl-amino-4-methyl-pyrimidine is obtained in solid, almost colorless crystals which melt at 92–93° C. The product thus obtained can be distilled without decomposition under 5 mms. pressure at 157–158° C. and yields a picrate which crystallizes from methyl alcohol in fine, yellow needles which melt at 177–178° C. A test compound prepared according to a different method showed no difference as to its melting point and mixed melting point.

In the foregoing examples all proportions are expressed in parts by weight.

We claim:

1. A process which comprises dissolving guanidine carbonate in sulfuric acid of over 50% strength, adding slowly 4-ethoxy-butene-(3)-ine(1) while stirring at a temperature not above 30° C., diluting with cold water, rendering the solution alkaline and recovering the 2-amino-4-methyl-pyrimidine formed.

2. A process which comprises dissolving guanidine carbonate in sulfuric acid of over 50% strength, adding slowly 4-methoxy-butene-(3)-ine(1) while stirring at a temperature not above 30° C., diluting with cold water, rendering the solution alkaline and recovering the 2-amino-4-methyl-pyrimidine formed.

3. A process which comprises dissolving n-butylguanidine-sulfate in sulfuric acid of over 50% strength, adding slowly 4-methoxy-butene-(3)-ine(1) while stirring at a temperature not above 30° C., diluting with cold water, rendering the solution alkaline and recovering 2-butyl-amino-4-methyl-pyrimidine formed.

4. Process that comprises reacting a 4-alkoxy-butene-3-ine-1, in the presence of an acid condensing agent, with a substance chosen from the class consisting of compounds represented by the general formula:

$$NH_2.CNH.NHR$$

wherein R is a substituent chosen from the group consisting of hydrogen, alkyl, aralkyl and aryl, and salts thereof, and recovering from the reaction mixture a reaction product represented by the general formula:

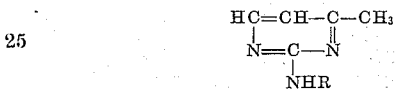

wherein R has the meaning assigned above.

5. A process as defined in claim 4 further characterized in that the reaction is conducted at a temperature not substantially exceeding about 30° C.

6. A process as defined in claim 5 further characterized in that subsequent to the reaction, the reaction mixture is diluted with water and made alkaline by addition of an alkaline substance.

7. A process as defined in claim 4 further characterized in that the substituent R is hydrogen.

8. A process as defined in claim 4 further characterized in that the substituent R is alkyl.

9. A process as defined in claim 4 further characterized in that the substituent R is aralkyl.

10. A process as defined in claim 4 further characterized in that the substituent R is aryl.

11. A process as defined in claim 4 further characterized in that the 4-alkoxy-butene-3-ine-1 is one wherein the alkoxy group has less than five carbon atoms.

HANS ANDERSAG.
HANS MAUSS.

No references cited.